(12) United States Patent
Hui et al.

(10) Patent No.: US 6,945,592 B1
(45) Date of Patent: Sep. 20, 2005

(54) SEALER TAPE AND CLIP ASSEMBLY

(75) Inventors: Paul Hui, Toronto, CA (US); George C. Floarea, Whitby (CA)

(73) Assignee: General Motors of Canada, Ltd., Oshawa (CA)

( * ) Notice: Subject to any disclaimer, the term of this patent is extended or adjusted under 35 U.S.C. 154(b) by 0 days.

(21) Appl. No.: 10/807,600

(22) Filed: Mar. 24, 2004

(51) Int. Cl.$^7$ .............................................. B62D 27/00
(52) U.S. Cl. ................. 296/187.01; 296/210
(58) Field of Search .......................... 296/187.01, 210, 296/213

(56) References Cited

U.S. PATENT DOCUMENTS

| | | | | |
|---|---|---|---|---|
| 4,792,180 A | * | 12/1988 | Jacobsen et al. | ............ 296/210 |
| 5,964,979 A | * | 10/1999 | George et al. | ............ 156/309.6 |
| 6,564,433 B2 | * | 5/2003 | Nagasawa | ............ 24/297 |
| 6,592,177 B1 | * | 7/2003 | Mathew | ............ 296/210 |
| 6,668,430 B2 | * | 12/2003 | Ichimaru | ............ 24/457 |
| 2002/0101096 A1 | * | 8/2002 | Nagasawa | ............ 296/210 |

* cited by examiner

*Primary Examiner*—Dennis H. Pedder
(74) *Attorney, Agent, or Firm*—Laura C. Hargitt

(57) ABSTRACT

A sealer tape and clip assembly in accordance with the present invention is adapted to be disposed in a recess, defined by at least one interior surface. The assembly includes a sealer tape member having an upper surface, a lower surface, and opposed side surfaces. An aperture extends through the upper surface and the lower surface, and is disposed between but does not extend through the opposed side surfaces. A clip body includes an upper portion, a lower portion, and an intermediate portion extending therebetween. The intermediate portion of the clip body is disposed in the aperture, the upper portion of the clip body engages the upper surface of the sealer tape member, and the lower portion of the clip body engages the lower surface of the sealer tape member. The sealer tape member sealingly bonds with the interior surface of the recess to secure the assembly in the recess.

15 Claims, 4 Drawing Sheets

SEALER TAPE AND CLIP ASSEMBLY

BACKGROUND OF THE INVENTION

The present invention relates generally to molding assemblies and the like and, in particular, to a sealer tape and clip assembly.

Moldings, which are placed in a recess such as a recess between adjoining body panels in an automobile body, are well known. Moldings are utilized for minimizing water and/or foreign object intrusion into the recess as well as for the aesthetic purpose of covering the recess from the customer's view in the final product.

Typically, moldings are attached to the automobile body by a clip assembly or the like disposed in the recess. One type of prior art clip assembly uses a one-piece plastic clip and structural adhesive tape assembly, installed on top of a pumpable flow sealer in the recess. The pumpable flow sealer, which prevents water leakage at the weld joint, is applied manually to the recess prior to the installation of the clip assembly. The heat cycle during the paint process activates the structural adhesive, resulting in a structural bonding of the plastic clip to the base material of the recess. The plastic clip is used as a mechanical fastener for the molding at the front and the rear of the ditch area. Another type of prior art clip assembly uses a double-sided tape along the length of the molding to attach to the base material. A leveling sealer tape is installed at the weld joint, which prevents water leakage at the weld joint. The leveling sealer tape seals the weld joint during the heat cycle of the paint process and also provides a more even surface to attach the double-sided tape adhesive. Each of the above-mentioned prior art clip assemblies disadvantageously require a two-step process because the sealant and the clip assembly are installed separately.

It is desirable, therefore, to provide a clip assembly that may be installed in a recess formed between a pair of body panels in simplified process, such as a one-step process.

SUMMARY OF THE INVENTION

A sealer tape and clip assembly in accordance with the present invention is adapted to be disposed in a recess, defined by at least one interior surface, extending along joined edges of a pair of vehicle body panels. The assembly includes an elongated sealer tape member having an upper surface, a lower surface, and opposed side surfaces. At least one aperture extends through the upper surface and the lower surface, and is disposed between but does not extend through the opposed side surfaces. The assembly includes at least one clip body having an upper portion, a lower portion, and an intermediate portion extending between the upper portion and the lower portion. The intermediate portion is disposed in the at least one aperture in the sealer tape member, the upper portion of the at least one clip body engages the upper surface of the sealer tape member, and the lower portion of the at least one clip body engages the lower surface of the sealer tape member. The sealer tape member is adapted to sealingly bond with the at least one interior surface of the recess to secure the assembly in the recess.

The clip assembly in accordance with the present invention advantageously combines the sealer tape member and clip body in a single assembly. The clip body embeds into the sealer tape member before installation. The clip body may also include a self-centering feature for cross car positioning to avoid the use of a fixture. The resulting one-piece assembly may be advantageously installed in a single-step process. Through the heat cycle of the painting process, the sealer tape melts and embeds the clip body, creating a structural bond between the clip body, the sealer tape and the base material of the recess. This structural bond eliminates the use of the separate structural adhesive tape or double-sided tape used in the prior art processes. The clip body provides a mechanical fastener for the molding member to enclose the recess. The clip assembly in accordance with the present invention combines the two-step process into one by creating the one-piece assembly. The clip assembly eliminates the use of a structural adhesive tape since the overlap bond of the sealer tape member and the clip body replaces the function of the structural adhesive tape, which reduces the cost of the clip assembly.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
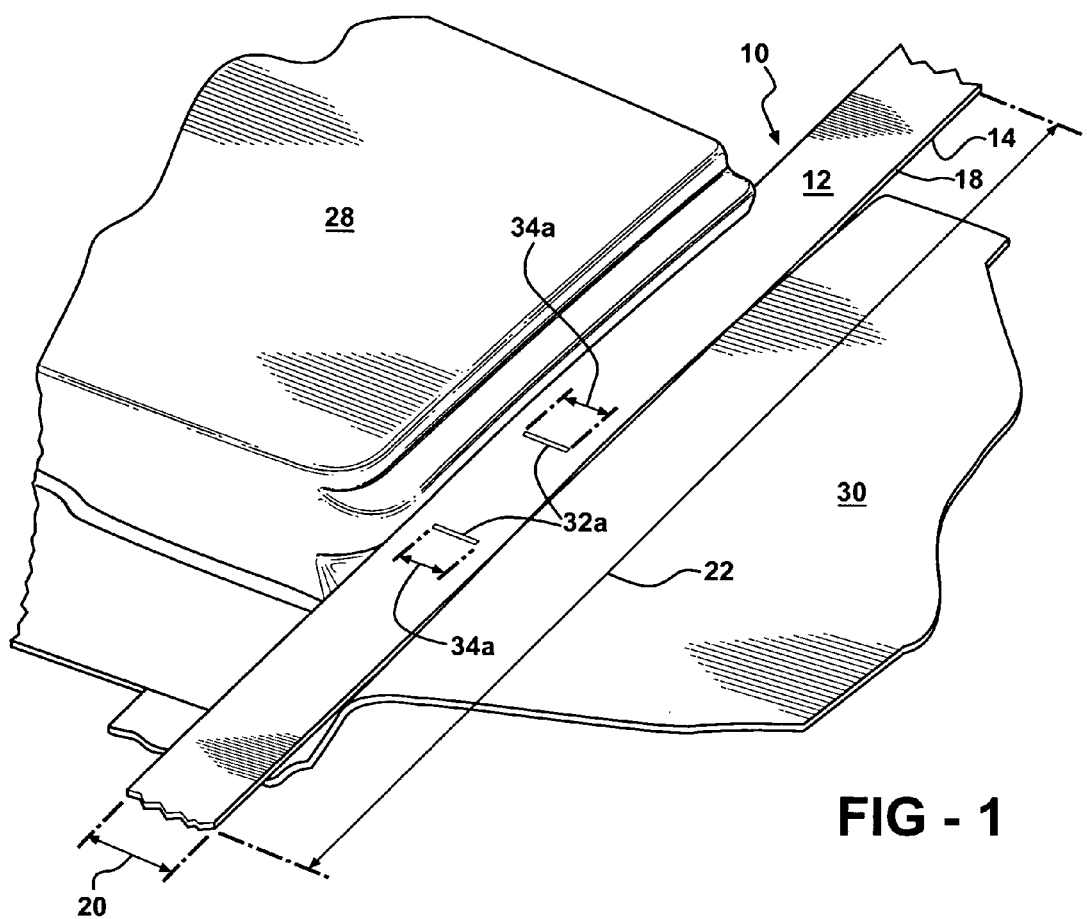
FIG. 1 is a fragmentary perspective view of a sealer tape member in accordance with the present invention shown mounted in a recess but without showing a clip body in order to more clearly shown and describe the invention.

Referring now to the first embodiment shown in FIGS. 1–4, a sealer tape member in accordance with the present invention is indicated generally at 10. The sealer tape member 10 includes an upper surface 12, a lower surface 14, and opposed side surfaces 16 and 18. The sealer tape member 10 is preferably constructed of a polymer or co-polymer material, such as ethylene vinyl acetate co-polymer, or a similar type material. The sealer tape member 10 has a width indicated by an arrow 20 and a length indicated by an arrow 22. The length 22 of the sealer tape member 10 is significantly greater than the width 20 of the sealer tape member 10. The sealer tape member 10 is adapted to be disposed in a recess 24, best seen in FIG. 3, extending along joined edges 26 of a first body panel 28 and a second body panel 30. Preferably, the body panels 28 and 30 are vehicle body panels, such as a vehicle body panel and a vehicle roof panel having the recess 24 formed therebetween. The recess 24 is defined by an interior surface 28a of the first body panel 28 and an interior surface 30a of the second body panel 30.

The sealer tape member 10 includes a pair of apertures 32a formed therein that extend through the upper surface 12 and the lower surface 14. The apertures 32a are disposed between but do not extend through the opposed side surfaces 16 and 18 of the sealer tape member 10. The apertures 32a have a length indicated by an arrow 34a and a width (not shown). The length 34a of the apertures 32a is greater than the width of the apertures 32a, and the length 34a of the apertures 32a extends substantially perpendicular to the length 22 of the tape member 10 and substantially parallel to the width 20 of the tape member 10.

Figure 2:
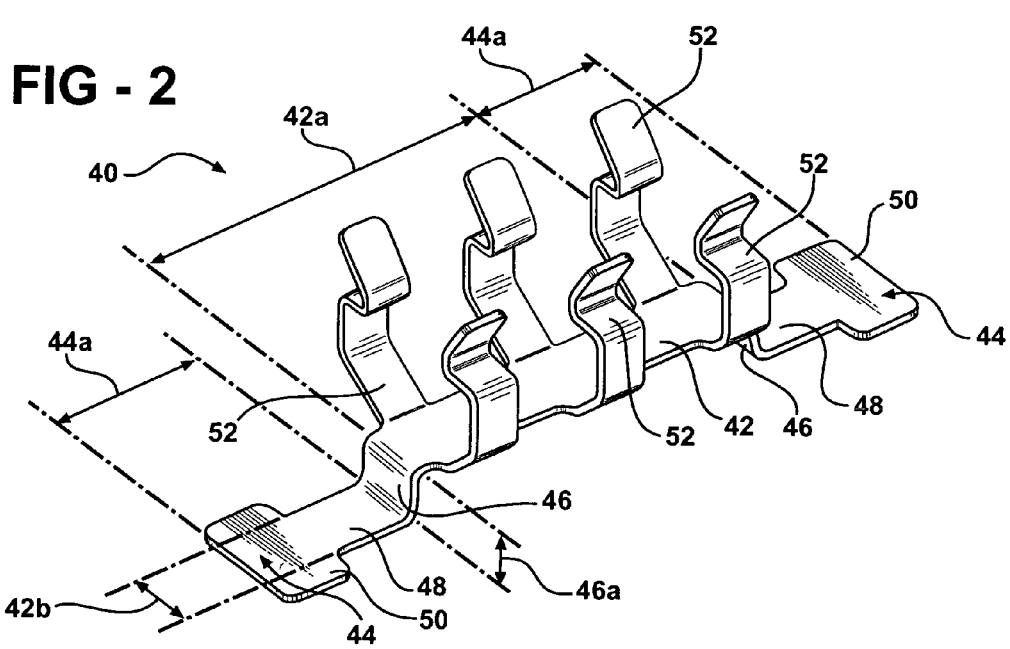
FIG. 2 is a perspective view of a clip body in accordance with the present invention.

Referring now to FIG. 2, a clip body in accordance with the present invention is indicated generally at 40. The clip body 40 may be formed of a plastic material, a metallic material, or the like. The clip body 40 includes a generally rectangular and substantially planar upper portion 42, a generally rectangular and substantially planar lower portion 44, and an intermediate portion 46 extending between the upper portion 42 and the lower portion 44. The intermediate portion 46 is a pair of arms extending downwardly from opposed ends of the upper portion 42 to attach the upper portion 42 to a pair of the lower portions 46. Each of the lower portions 44 extends from a smaller width arm 48 attached to the intermediate portion 46 to a larger width tab 50 at a free end thereof. The upper portion 42 has a length indicated by an arrow 42a and a width indicated by an arrow 42b. Similarly, the lower portion 44 has a length indicated by an arrow 44a and the intermediate portion 46 has a length indicated by an arrow 46a. The upper portion 42 includes a plurality of spaced apart pairs of projections or prongs 52 extending from an upper surface thereof. The pairs of the prongs 52 define a space 54 therebetween, best seen in FIG. 3, for cooperating and engaging with a molding member (not shown). Each of the prongs 52 includes a substantially horizontal portion 58 for retaining the molding member in the space 54.

Figure 3:
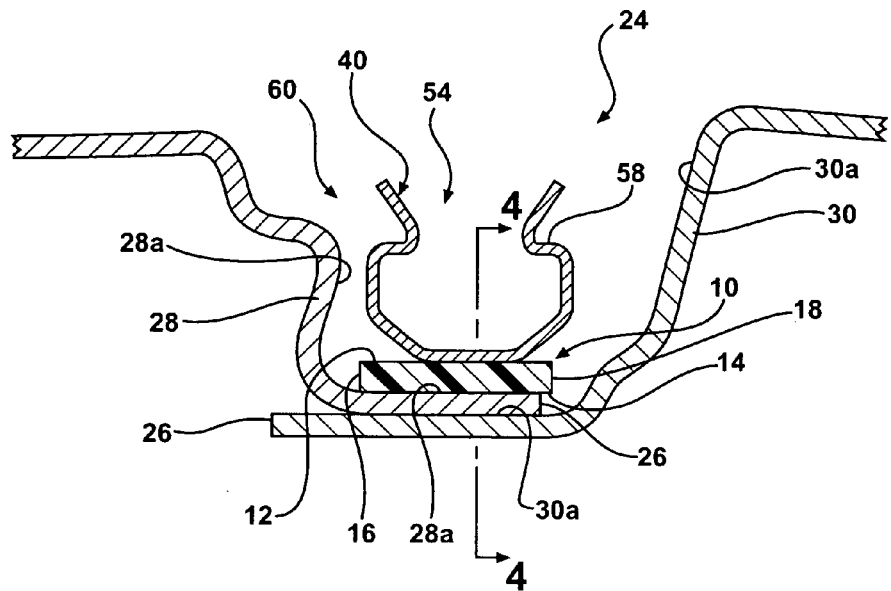
FIG. 3 is a cross-sectional end view of the clip body of FIG. 2 shown attached to the sealer tape member of FIG. 1 and mounted in the recess.
Figure 4:
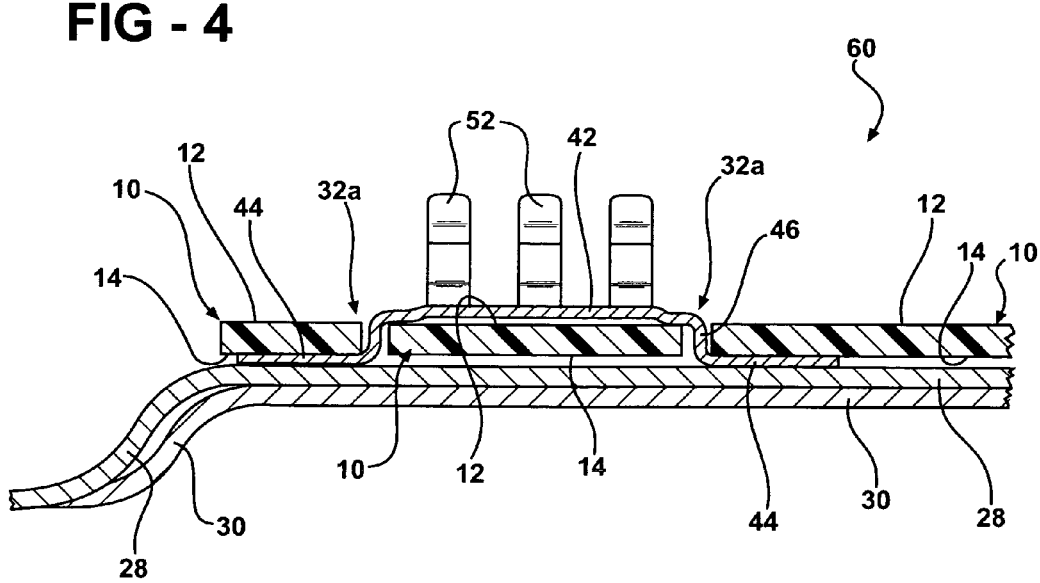
FIG. 4 is a fragmentary cross-sectional side view of the clip body and sealer tape member taken along line 4—4 in FIG. 3.

Referring now to FIGS. 3 and 4, the sealer tape member 10 and the clip body 40, when attached, form a sealer tape and clip body assembly, indicated generally at 60. The intermediate portions 46 of the clip body 40 are disposed in the apertures 32a in the sealer tape member 10. Preferably, the length 34a and width of the apertures 32a is substantially equal to the length 46a and width (not shown) of the intermediate portions 46. The upper portion 42 of the clip body 40 engages with the upper surface 12 of the sealer tape member 10, best seen in FIG. 4. The lower portion 44 of the clip body 40 engages the lower surface 14 of the sealer tape member 10, best seen in FIG. 4.

In operation, the clip body 40 is pre-assembled to the sealer tape member 10, forming the tape and clip body assembly 60. This assembly 60 may be sent to a vehicle (not shown) or other assembly plant ready for use. The sealer tape and clip body assembly 60 is disposed in the recess 24, then the assembly 60 and the body portions 28 and 30 are subjected to a mechanism to seal the sealer tape member 10 to the surfaces 28a or 30a of the recess. For example, the assembly 60 and the body portions 28 and 30 may be exposed or subjected to a high temperature, such as in the interior of a paint baking oven (not shown) or the like. The temperature is high enough such that the polymer or co-polymer material of the sealer tape member 10 at least partially melts. The melting of the polymer or co-polymer material of the sealer tape member 10 material seals and bonds the assembly 60 to at least one of the interior surfaces 28a or 30a of the recess 24 to secure the assembly 60 in the recess 24. Preferably, the sealer tape member 10 creates a structural bond between at least one of the interior surfaces 28a or 30a and the clip body 40. In FIG. 3, the sealer tape member 10 would melt and form a bond with the surface 28a but those skilled in the art will realize that the bonding may occur between the sealer tape member 10 of the assembly 60 and either or both of the surfaces 28a and 30a, depending on the configuration of the recess 24 formed between the panels 28 and 30.

Figure 5:
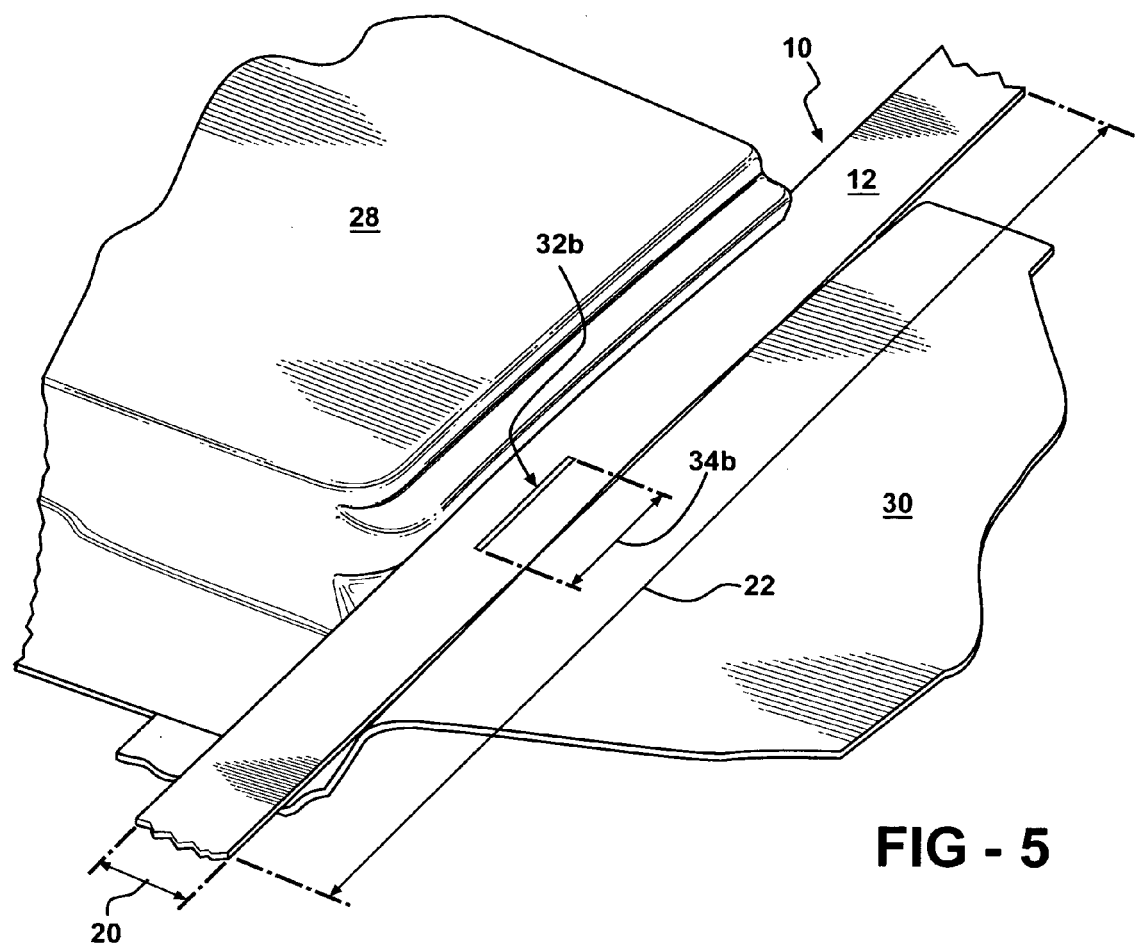
FIG. 5 is a fragmentary perspective view of an alternative embodiment of a sealer tape member in accordance with the present invention shown mounted in a recess but without showing a clip body in order to more clearly shown and describe the invention.
Figure 6:
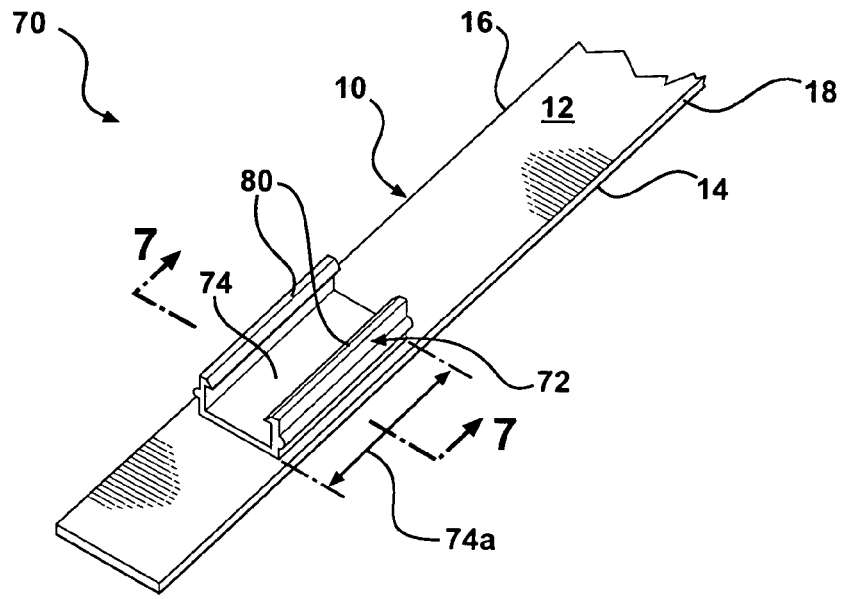
FIG. 6 is a perspective view of an alternative embodiment of a clip body in accordance with the present invention shown attached to the sealer tape member of FIG. 5.
Figure 7:
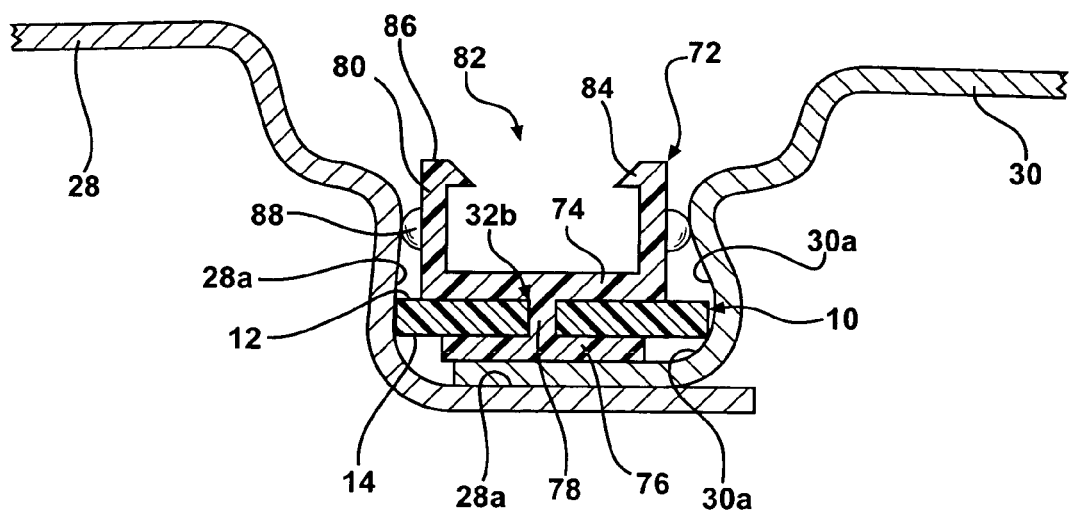
FIG. 7 is a cross-sectional end view of the clip body and sealer tape member taken along line 7—7 in FIG. 5 and shown mounted in the recess.

Referring now to the second embodiment shown in FIGS. 5–7, the sealer tape member 10 includes an aperture 32b formed therein that extends through the upper surface 12 and the lower surface 14. The aperture 32b is disposed between but does not extend through the opposed side surfaces 16 and 18 of the sealer tape member 10. The aperture 32b has a length indicated by an arrow 34b and a width (not shown). The length 34b of the aperture 32b is greater than the width of the aperture 32b, and the length 34b of the aperture 32b extends substantially parallel to the length 22 of the tape member 10 and substantially perpendicular to the width 20 of the tape member 10.

An alternative embodiment of a sealer tape and clip body assembly in accordance with the present invention is indicated generally at 70. The assembly 70 includes a clip body 72 having an elongated, generally rectangular and substantially planar upper portion 74 having a length indicated by an arrow 74a, and an elongated, generally rectangular and substantially planar lower portion 76 having a length (not shown). The clip body 72 may be formed of a plastic material, a metallic material, or the like. Preferably the length 74a of the upper portion 74 and the length of the lower portion 76 are approximately equal. An intermediate portion 78 extends between the upper portion 74 and the lower portion 76 at least a part of the length 74a of the upper portion 74 and the length of the lower portion 76. Preferably, the intermediate portion 78 is disposed midway between opposed ends of each of the upper 74 and lower 76 portions. The assembly 70 also includes the sealer tape member 10 of FIG. 1b having the aperture 32b formed therein. The intermediate portion 78 of the clip body 70 is adapted to be disposed in the aperture 32b when the clip body 70 and the sealer tape member 10 are attached to form the assembly 70. Preferably, the length 34b and width of the aperture 34a is substantially equal to the length (not shown) and width (not shown) of the intermediate portions 46. The upper portion 74 of the clip body 72 engages with the upper surface 12 of the sealer tape member 10, best seen in FIG. 6. The lower portion 76 of the clip body 72 engages the lower surface 14 of the sealer tape member 10, best seen in FIG. 6.

The upper portion 74 includes a pair of spaced apart projections or prongs 80 extending from an upper surface thereof and extending along the length 74a of the upper portion 74. The pair of the prongs 80 define a space 82 therebetween for cooperating and engaging with a molding member (not shown). Each of the prongs 80 includes an inwardly extending barb 84 on a free end 86 thereof for engaging and retaining the molding member in the space 82. Each prong 80 includes an outer surface from which a self-centering member 88 extends in a direction opposite of the inwardly extending portions 84. Each self-centering member 88 will engage with a respective one of the interior surfaces 28a and 30a of the body panels 28 and 30. The self-centering members 88 assure that the clip body 72, and thus the molding member, will be properly aligned in the recess 24.

In operation, the clip body 72 is pre-assembled to the sealer tape member 10, forming the tape and clip body assembly 70. This assembly 70 may be sent to a vehicle (not shown) or other assembly plant ready for use. The sealer tape and clip body assembly 70 is disposed in the recess 24, then the assembly 70 and the body portions 28 and 30 are subjected to a mechanism to seal the sealer tape member 10 to the surfaces 28a or 30a of the recess. For example, the assembly 70 and the body portions 28 and 30 may be exposed or subjected to a high temperature, such as in the interior of a paint baking oven (not shown) or the like. The temperature is high enough such that the polymer or co-polymer material of the sealer tape member 10 at least partially melts. The melting of the polymer or co-polymer material of the sealer tape member 10 material seals and bonds the assembly 70 with at least one of the interior surfaces 28a or 30a of the recess 24 to secure the assembly 70 in the recess 24. Preferably, the sealer tape member 10 creates a structural bond between at least one of the interior surfaces 28a or 30a and the clip body 72. In FIG. 6, the sealer tape member 10 would melt and form a bond with each of the surfaces 28a and 30a but those skilled in the art will realize that the bonding may occur between the sealer tape member 10 of the assembly 70 and either or both of the surfaces 28a and 30a, depending on the configuration of the recess 24 formed between the panels 28 and 30.

In accordance with the provisions of the patent statutes, the present invention has been described in what is considered to represent its preferred embodiment. However, it should be noted that the invention can be practiced otherwise than as specifically illustrated and described without departing from its spirit or scope.

We claim:

1. A sealer tape and clip assembly adapted to be disposed in a recess extending along joined edges of a pair of vehicle body panels, the recess defined by at least one interior surface, comprising:
   an elongated sealer tape member having an upper surface, a lower surface, and opposed side surfaces, said sealer tape member including at least one aperture extending through said upper surface and said lower surface, said at least one aperture disposed between but not extending through said opposed side surfaces of said sealer tape member; and
   at least one clip body having an upper portion, a lower portion, and an intermediate portion extending between the upper portion and the lower portion, said intermediate portion disposed in said at least one aperture in said sealer tape member, the upper portion of said at least one clip body engaging said upper surface of said sealer tape member, the lower portion of said at least one clip body engaging said lower surface of said sealer tape member, said sealer tape member adapted to sealingly bond with the at least one interior surface of the recess to secure said assembly in the recess.

2. The assembly according to claim 1 wherein said sealer tape member includes a length and a width, said length of said sealer tape member being greater than said width of said sealer tape member, and said aperture has a length, said length of said aperture extending parallel to said length of said sealer tape member.

3. The assembly according to claim 1 wherein said sealer tape member includes a length and a width, said length of said sealer tape member being greater than said width of said sealer tape member, and said aperture has a length, said length of said aperture extending perpendicular to said length of said sealer tape member.

4. The assembly according to claim 1 wherein said sealer tape member includes a length and a width, said length of said sealer tape member being greater than said width of said sealer tape member, and a pair of aperture having a length, said length of said pair of apertures extending perpendicular to said length of said sealer tape member, and wherein said clip body includes a pair of said intermediate portions disposed in said pair of apertures and a pair of said lower portions engaging said lower surface of said sealer tape member.

5. The assembly according to claim 1 wherein said clip body is formed of a plastic material.

6. The assembly according to claim 1 wherein said clip body is formed of a metallic material.

7. The assembly according to claim 1 wherein said sealer tape member is formed of a polymer material.

8. The assembly according to claim 1 wherein said sealer tape member is formed of a co-polymer material.

9. The assembly according to claim 1 wherein said at least one clip body includes a plurality of projections extending upwardly from the upper portion thereof.

10. The assembly according to claim 9 including a plurality of self-locating features extending outwardly from said projections.

11. The assembly according to claim 9 wherein said plurality of projections is a plurality of spaced apart pairs of prongs.

12. The assembly according to claim 9 wherein said plurality of projections is a pair of spaced prongs extending along a length of the upper portion.

13. A method for attaching a sealer tape and clip assembly in a recess extending along joined edges of a pair of vehicle body panels, the recess defined by at least one interior surface, comprising the steps of:
   a) providing an elongated sealer tape member having an upper surface, a lower surface, and opposed side surfaces, said sealer tape member including at least one aperture extending through said upper surface and said lower surface, said at least one aperture disposed between but not extending through said opposed side surfaces of said sealer tape member;
   b) providing at least one clip body having an upper portion, a lower portion, and an intermediate portion extending between the upper portion and the lower portion;
   c) inserting the intermediate portion of said at least one clip body into the at least one aperture of said sealer tape member to form said assembly, the upper portion of said at least one clip body engaging the upper surface of said sealer tape member, the lower portion of said at least one clip body engaging the lower surface of said sealer tape member;
   d) placing said assembly in the recess;
   e) subjecting said assembly and the vehicle body to a high ambient temperature, whereby said sealer tape member sealingly bonds with the at least one interior surface of the recess to secure said assembly in the recess.

14. The method according to claim 13 wherein the step a) is further defined by said sealer tape member including a length and a width, said length of said sealer tape member being greater than said width of said sealer tape member, and said aperture having a length, said length of said aperture extending parallel to said length of said sealer tape member.

15. The method according to claim 13 wherein the step a) is further defined by said sealer tape member including a length and a width, said length of said sealer tape member being greater than said width of said sealer tape member, and said aperture having a length, said length of said aperture extending perpendicular to said length of said sealer tape member.

* * * * *